US004001778B2

United States Statutory Invention Registration [19]

[11] Reg. Number: H1778

Wagaman et al. [45] Published: Feb. 2, 1999

[54] METHOD OF PRODUCING HIGH BULK DENSITY SPHEROIDAL NITROGUANIDINE

[75] Inventors: Kerry L. Wagaman; Chester F. Clark, both of Waldorf; William S. Jones, La Plata; Steven L. Collignon, Waldorf, all of Md.; Christopher C. Wilmot, Centreville, Va.

[73] Assignee: The United States of America as represented by the Secretary of the Navy, Washington, D.C.

[21] Appl. No.: 210,886

[22] Filed: Jun. 23, 1988

[51] Int. Cl.[6] ..... C06B 21/00

[52] U.S. Cl. ..... 149/109.6; 149/36; 264/3.4

*Primary Examiner*—Edward A. Miller

*Attorney, Agent, or Firm*—Kenneth E. Walden; Roger D. Johnson

[57] ABSTRACT

A process for producing high bulk density spheroidal nitroguanidine by forming a solution of from 2 to 9 weight percent of nitroguanidine, 0.5 to 2.0 weight percent of methylcellulose, and 0.5 to 2.0 weight percent of partially hydrolyzed poly(vinyl alcohol) in water at a temperature of from 50° C. to 100° C., and then cooling the solution at a rate of from I to 20° C./minute until the solution temperature is less than 40° C.

7 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF PRODUCING HIGH BULK DENSITY SPHEROIDAL NITROGUANIDINE

BACKGROUND OF THE INVENTION

This invention relates to guanidines and more particularly to nitroguanidine.

Nitroguanidine is a mass detonating explosive. It is a white crystalline powder with a specific gravity of 1.77. Tests conducted at the Naval Ordnance Laboratory in White Oak, Maryland, (February 1968) showed that in its range of detonability, nitroguanidine behaves as a group I Explosive Class 1, Division 1 (Old Class 7), DOT Class A. This means that it is a mass detonating hazard. The entire quantity will explode virtually instantaneously when a small portion is subjected to the impulse of an initiating agent, or to the effect of a considerable discharge of energy from without, or from sympathetic detonation or propagation. Such an explosion normally will cause severe structural damage to adjacent objects and the simultaneous explosion of other separated explosives and ammunition placed sufficiently close to the initially exploding mass. Casting powder, bulk explosives such as TNT, HMX, RDX, and most warheads and bombs are in this class.

Nitroguanidine is a powerful high explosive which when incorporated in a propellant in appreciable quantities, results in a propellant that burns in a gun with a temperature so cool that little muzzle flash is produced. Nitroguanidine was first prepared by Jousselin in 1877, and found its original application in cool, burning triple-base, Naval gun propellants in trench mortar shells. Its principal use, however, is in smokeless propellant, due to its property of eliminating flash. In later years nitroguanidine has been developed as an ingredient in propellants for rockets and missiles. High bulk density nitroguanidine (HBNQ) is prepared for these later applications.

Nitroguanidine exists in at least 2 crystal forms: an alpha and a beta. The alpha form crystallizes from hot water as long, thin, flexible, lustrous needles which are tough and pulverize with difficulty. It is the form most commonly used in the explosive industry. The beta form crystallizes from hot water in fern-like clusters of small, thin, elongated plates. The beta form may, be converted into the alpha by dissolution in concentrated sulfuric acid and drowning in water.

A communitor with a hammer speed of 7500 RPM is used to reduce the HBNQ particles to desired size. There are two variables to control the particle size: screen size and feed rate. By keeping the screen and hammer speed constant, but changing to a heavier gauge screen, a smaller particle size is achieved. Therefore, when going to heavier gauge screens for greater strength, it is necessary to increase the size of the opening if the same product size is needed. A uniform feed rate is essential for uniform end product. A built-in feeder permits continuous operation and maximum performance. Once the communitor is set to deliver a certain product it will continue to produce exactly the same results. This last step is very labor-consuming and has a high potential for exploding during the crushing and also the drying operations. Also, the convection oven drying of the nitroguanidine releases undesirable organic chemicals into the environment.

Finally, the HBNQ which is produced by these prior art methods is rodshaped or needleshaped and therefore difficult to use in explosive manufacturing processes such as extrusion and melt casting.

SUMMARY OF THE INVENTION

Accordingly, an object of this invention is to provide high bulk density nitroguanidine.

Another object of this invention is to provide a safer method of producing high bulk density nitroguanidine.

A further object of this invention is to eliminate the need for reducing nitroguanidine particle size by hammering.

Yet another object of this invention is to provide a method which will produce spheroidal rather than rodshaped or needleshaped nitroguanidine crystals.

These and other objects of this invention are accomplished by providing:

a process for recrystallizing nitroguanidine by (1) forming an aqueous nitroguanidine solution at a temperature of from about 50° C. to about 100° C. which comprises
   - (a) from 2 to 9 weight percent of nitroguanidine,
   - (b) from 0.5 to 2.0 weight percent of methyl cellulose,
   - (c) from 0.5 to 2.0 weight percent of partially hydrolyzed poly(vinyl alcohol); and with
   - (d) water being the remainder of the solution;

(2) cooling the aqueous nitroguanidine solution under continuous agitation at a cooling rate of from 1° C./minute to 20° C./minute until the temperature of the solution is below 40° C.; and (3) isolating the product spheroidal nitroguanidine crystals.

DETAILED DESCRIPTION OF THE PREFERRED EMBODIMENT

The present invention is a process for converting leaf shaped, rodshaped, or needlelike crystals of low bulk density nitroguanidine (NQ) into spheroidal crystals of high bulk density nitroguanidine (HBNQ). Critical to the formation of spheroidal HBNQ are the process features of 1. adding a mixture of methyl cellulose (METHOCEL) and a partially hydrolyzed poly(vinyl alcohol) as a crystal modifier to the aqueous nitroguanidine solution.
2. continuous, preferably vigorous, agitation of the nitroquanidine solution during cool down; and
3. cooling down at a controlled rate.

The use of a combination of methyl cellulose and a polyvinyl alcohol is critical to this process. Methyl cellulose alone as an additive produces spheroidal nitroguanidine for nitroguanidine concentrations up to 5 weight percent in water, but nitroguanidine concentrations of 6 weight percent or more produce rodshaped nitroguanidine crystals. When poly(vinyl alcohol) alone is used, rodshaped crystals are produced at all concentrations of nitroguanidine in water. However, by using a mixture of methyl cellulose and polyvinyl alcohol, spheroidal nitroguanidine has been produced from 9 weight percent aqueous nitroguanidine solutions (the highest concentration tested). It would appear that there is a cooperative effect between the methyl cellulose and the polyvinyl alcohol additives. From about 0.5 to about 2.0 and more preferably from 0.6 to 1.0 weight percent of methylcellulose is used in the aqueous nitroguanidine solution. Similarly from about 0.5 to 2.0 and preferably from 0.6 to 1.0 weight percent of partially hydrolyzed polyvinyl alcohol is used in the solution.

Commercial methyl cellulose is used in the present process. The Merck Index (10th edit.), page 866, monograph no. 5917, states that commercial methylcellulose (or methyl cellulose ether) has a methoxyl content of 29% (degree of substitution about 1.8) and that it is available under proprietary names such as Methocel, Cellothyl, Syncelose, Bagolax, Cethylose, Cethytin, Cologel Cellumeth, Hydrolose, Nicel, Tearisol, Tylose, etc.

Poly(vinyl alcohol) is prepared by the alcoholysis of poly(vinyl acetate). A 85 to 90% hydrolyzed (acetal content 15 to 10%) and preferably 87 to 89% hydrolyzed (acetal content 13 to 11%) poly(vinyl alcohol is used in the present process. These partially hydrolyzed poly(vinyl alcohols) have good solubilities in water for both the high and low temperature ranges of this process, with 87–89% hydrolyzed poly(vinyl alcohols) being optimal. The Merck Index (10th edition) page 1095, monograph No. 7458, provides information on and a list of proprietary names for poly(vinyl alcohol).

The cooling rate of the crystallization solution is an important factor in determining the crystal shape. Rates lower than 1°F./minute do not produce the desired spheroidal crystals. In contrast, Example 1 had, by far, the fastest cooling rate (88.5° C./min) and produced conventional needlelike crystals for an aqueous 5 weight percent nitroguanidine/0.6 weight percent methylcellulose solution whereas slower cooling rates (e.g., 20° C./min. or less) produce spheroidal crystals from that solution. It appears that at rapid cooling rates the methylcellulose does not have time to operate as a crystal habit modifier. Although the rapid cooling problem has not been demonstrated for the methylcellulose/poly(vinyl alcohol) combination it seems reasonable that slower cooling rates are preferable. The cooling rates in the present process are preferably 1° C./min to 20° C./min, more preferably 1° C./min to 10° C./min, and still more preferabley 1° C./min to 5° C./min.

The general nature of the invention having been set forth, the following examples are presented as specific illustrations thereof. It will be understood that the invention is not limited to these specific examples but is susceptible to various modifications that will be understood by one of ordinary skill in the art.

EXAMPLES 1 THROUGH 26

The following procedure was used in each of the 26 examples summarized in Table 1.

1. 1.06 liters of distilled water was heated to 68° C. (155° F.).

2. While being agitated, dry methyl cellulose or polyvinyl alcohol or a combination of both were added to the distilled water.

3. The solution was then heated further to 82° C. (1800F), then cooled to below 32° C. (90° F.).

4. The solution was then diluted with 0.94 liter of distilled water and reheated to 82° C. (180° F.).

5. While being agitated, the desired concentration of nitroguandine (NQ) was added to the solution.

6. The solution was heated to boiling, 100° C. (212° F.).

7. While being agitated, the solution was cooled at a constant rate to below 41° C. by dropping ice into the 3-liter-reactor (experiments 1 to 10) or allowing a cold stream of water to enter the steam bath (experiments 11 to 26).

8. The agitator was turned off and the crystals were allowed to settle.

9. The supernatant liquid was decanted off and the crystals were washed with distilled water in the 3-liter flask.

10. The crystals were collected on a fritted polyethylene Buchner funnel and then sent for analysis.

TABLE 1

| Experiment Number | NQ Concentration % | Agitator Speed (rpm) | Additive 1,2 (Concentration weight %) | Average Cooling Rate °C./min From 100° C. to below 41° C. | Bulk Density g/cm$^3$ |
|---|---|---|---|---|---|
| 1 | 5 | 900 | Methocel (0.6) | 88.5 | 0.69 |
| 2 | 2 | 700 | Methocel (0.6) | 15.3 | 0.83 |
| 3 | 2 | 900 | Methocel (0.6) | 12.8 | 0.87 |
| 4 | 2 | 300 | Methocel (0.6) | 12.5 | — |
| 5 | 5 | 700 | Methocel (0.6) | 14.4 | 0.71 |
| 6 | 4 | 800 | Methocel (0.6) | 11.7 | 0.74 |
| 7 | 5 | 800 | Methocel (0.6) | 14.0 | 0.83 |
| 8 | 5 | 800 | Methocel (2.0) | 15.3 | — |
| 9 | 2 | 750 | Methocel (0.6) | 4.6 | — |
| 10 | 2 | 700 | Methocel (0.6) | 4.8 | — |
| 11 | 5 | 750 | Methocel (0.6) | 8.8 | 0.95 |
| 12 | 6 | 800 | Methocel (0.6) | 2.0 | 0.89 |
| 13 | 6 | 900 | Methocel (0.6) | 5.2 | 0.94 |
| 14 | 6 | 825 | Methocel (2.0) | 1.6 | 0.91 |
| 15 | 6 | 500 | Methocel (2.0) | 1.8 | 0.88 |
| 16 | 6 | 750 | VINOL 540 (1.0) | 2.0 | 0.87 |
| 17 | 2 | 700 | VINOL 540 (0.6) | 1.9 | 0.83 |
| 18 | 2 | 700 | VINOL 523 (0.6) | 2.0 | 0.80 |
| 19 | 6 | 750 | VINOL 540 (0.6) Methocel (0.6) | 2.1 | 0.93 |
| 20 | 7 | 850 | VINOL 540 (0.6) Methocel (0.6) | 2.0 | 0.96 |
| 21 | 8 | 750 | VINOL 540 (0.6) Methocel (0.6) | 2.4 | 0.87 |
| 22 | 9 | 600 | VINOL 540 (1.0) Methocel (1.0) | 1.9 | 0.90 |
| 23 | 8 | 750 | VINOL 540 (0.6) Methocel (0.6) | 2.2 | 0.92 |
| 24 | 8 | 750 | VINOL 540 (0.6) Methocel (0.6) | 4.2 | 0.89 |
| 25 | 8 | 700 | VINOL 540 (0.6) Methocel (0.6) | 4.5 | 0.86 |

TABLE 1-continued

| Experiment Number | NQ Concentration % | Agitator Speed (rpm) | Additive 1,2 (Concentration weight %) | Average Cooling Rate °C./min From 100° C. to below 41° C. | Bulk Density g/cm$^3$ |
|---|---|---|---|---|---|
| 26 | 8 | 700 | VINOL 523 (0.6) Methocel (0.6) | 3.0 | 0.89 |

1. VINOL ® 523 and VINOL ® 540 are partially hydrolyzed (87.0–89.0) poly(vinyl alcohol) polymers [9002-89-5] (PVA) which are available form the polymer chemicals division of Air Products and Chemicals, Inc., Box 538, Allentown, PA 18105. The viscosities of 4% aqueous solutions at 20° C. are 22–26 CPS for VINOL ® 523 and 40–50 CPS for VINOL ® 540. The pH range is 4.0–6.0 for 4% aqueous solution of both VINOL ® 523 and VINOL ® 540.
2. METHOCEL ® is a tradename for a commercially available methylcellulose (i.e., cellulose methyl ether).

Obviously, numerous modifications and variations of the present invention are possible in light of the above teachings. It is therefore to be understood that within the scope of the appended claims the invention may be practiced otherwise than as specifically described herein.

What is claimed is:

1. A process for recrystallizing nitroguanidine comprising:

(1) forming an aqueous nitroguanidine solution at a temperature of from about 50° C. to about 100° C. which comprises (a) from 2 to 9 weight percent of nitroguanidine;

(b) from 0.5 to 2.0 weight percent of methyl cellulose, (c) from 0.5 to 2.0 weight percent of a polyvinyl alcohol; and with (d) water being the remainder of the solution;

(2) cooling the aqueous nitroguanidine solution under continuous and vigorous agitation at a cooling rate of from 1° C./minutes to 20° C./minute until the temperature of the solution is below 40° C.; and (3) isolating the product spheroidal nitroguanidine crystals.

2. The process of claim 1 wherein nitroquandine comprises from 6 to 8 weight percent of the nitroguanidine solution in step (1).

3. The process of claim 1 wherein methyl cellulose comprises from 0.6 to 1.0 weight percent of the nitroguanidine solution in step (1).

4. The process of claim 1 wherein the polyvinyl alcohol comprises from 0.6 to 1.0 weight percent of the nitroguandine solution in step (1).

5. The process of claim 1 wherein the temperature in step (1) is from 50° C. to 100° C.

6. The process of claim 1 wherein the cooling rate in step (2) is from 1° C. to 20° C./min.

7. The process of claim 1 wherein the aqueous nitroguanidine solution is agitated in step (2) by stirring.

* * * * *